May 24, 1938.   H. A. BERGERT   2,118,754
BEARING PULLER
Filed March 29, 1937
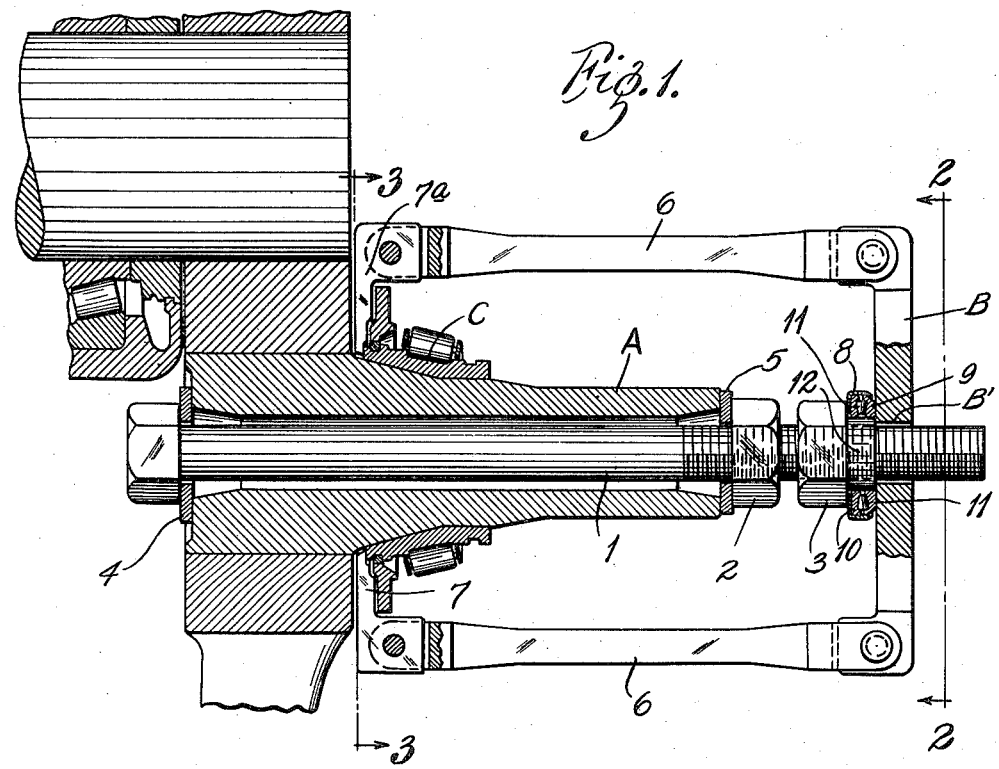
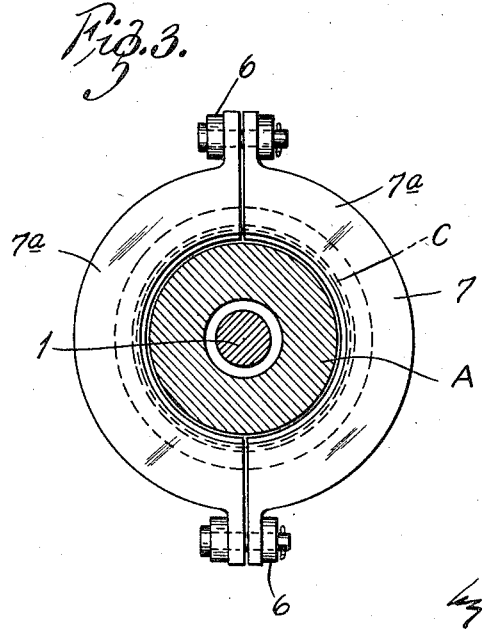
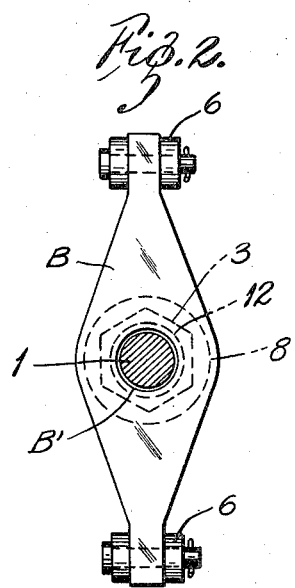
INVENTOR:
Henry A. Bergert
HIS ATTORNEYS Patented May 24, 1938

2,118,754

UNITED STATES PATENT OFFICE 2,118,754

BEARING PULLER

Henry A. Bergert, Canton, Ohio, assignor to The Timken Roller Bearing Company, Canton, Ohio, a corporation of Ohio Application March 29, 1937, Serial No. 133,526

4 Claims. (Cl. 29—85)

My invention relates to apparatus for pulling off bearing cones, bushings and the like. Its principal object is to devise a simple and powerful apparatus for removing such cups and bushings and it consists in the combinations and arrangements of parts hereinafter described and claimed.

In the accompanying drawing, wherein like symbols refer to like parts wherever they occur, Fig. 1 is a central longitudinal sectional view showing my apparatus applied to a locomotive crank pin in position to remove an inner bearing cone therefrom;

Fig. 2 is a transverse section on the line 2—2 in Fig. 1; and

Fig. 3 is a transverse section on the line 3—3 in Fig. 1.

My apparatus comprises a bolt 1 adapted to extend through the crank pin A or other part on which the bearing cone, bushing or the like is mounted. The threaded portion of this bolt has two nuts 2, 3. Between the inner nut and the head of the bolt are two washers 4, 5 adapted to bear against the ends of the crank pin or other part through which said bolt extends so that the tightening of the inner nut 2 will hold said bolt firmly in place. Beyond the outer nut 3 is a beam or frame B which is provided with a hole B' through which the end of the bolt may extend. The ends of the beam or frame are provided with bars or rods 6, preferably in the form of links pivoted at one end to said beam or frame and pivoted at the other end to the outer marginal portion of a stripper plate 7. This stripper plate is preferably made in two sections 7a whose inner edges are in the form of concave circular arcs of a diameter to straddle the portion of the crank pin next to the end of the bearing cone or bushing C. Between the outer nut 3 and the beam is a thrust bearing 8 which consists of two raceway members 9, 10 with taper rollers 11 interposed between them, the axes of the rollers being substantially perpendicular to the axis of the bolt. The raceway members 9, 10 are clear of the bolt, one of them being mounted on a cylindrical projection 12 of the outer nut 3 which serves as a pilot hub for said thrust bearing.

The operation of the device hereinbefore described is as follows: The bolt is inserted through the axial bore of the crank pin with one washer interposed between its head and the large end of the crank pin and another washer interposed between the inner nut 2 and the other end of the crank pin. The inner nut is then tightened to clamp the bolt on said pin. The outer nut 3 is run back far enough to permit the parts of the stripper plate 7 to be swung into position to overlap the end of the bearing cone. Then the outer nut is turned to force the thrust bearing against the beam, the force applied to the beam being transmitted through it to the links or tie rods and thence through the stripper plate to the end of the cone. The use of the thrust bearing eliminates rubbing friction and makes it practicable for the manual device to do work which has heretofore required a power press.

While my device is particularly adapted for removing the heavy press fitted bearing cones of locomotive crank pins, it is suitable for pulling other bearing cones and bushings and is of general application for removing sleeves or tubular members mounted on pins, shafts or other parts that are axially bored.

What I claim is:

1. A headed and threaded through bolt adapted to extend through the bore of a crank pin, a nut with a threaded bore extending therethrough, said nut working on said bolt to removably fix said bolt on said pin, a pulling device movable endwise of said bolt and adapted to engage a bearing member on said crank pin, a second nut with a threaded bore extending therethrough, said second nut working on said bolt and a roller thrust bearing between said second nut and said pulling device.

2. A headed and threaded through bolt adapted to extend through the bore of a crank pin, a nut with a threaded bore extending therethrough, said nut working on said bolt to removably fix said bolt on said pin, a pulling device movable endwise of said bolt, a second nut with a threaded bore extending therethrough, said second nut working on said bolt and a roller thrust bearing between said second nut and said pulling device, said pulling device having radially movable plates having concave recesses in their inner margins adapted to grip a bearing member.

3. A headed and threaded through bolt adapted to extend through the bore of a crank pin, a nut with a threaded bore extending therethrough, said nut working on said bolt to removably fix said bolt on said pin, a pulling device movable endwise of said bolt, a second nut with a threaded bore extending therethrough, said second nut working on said bolt and a roller thrust bearing between said second nut and said pulling device, said pulling device comprising a portion cooperating with said second nut, plates with concave recesses adapted to engage a bearing member and links connecting said plates to said first mentioned portion.

4. A headed and threaded through bolt adapted to extend through the bore of a crank pin or the like, a washer thereon adapted to bear against the end of said pin, a nut with a threaded bore extending therethrough, said nut working on said bolt to press said washer against the end of said pin, a pulling device movable endwise of said bolt and adapted to engage a bearing member on said crank pin, a second nut with a threaded bore extending therethrough, said second nut working on said bolt and a roller thrust bearing between said second nut and said pulling device.

HENRY A. BERGERT.